Jan. 10, 1950 M. W. ROSEN 2,493,778
KEYING SYSTEM
Filed Aug. 3, 1945
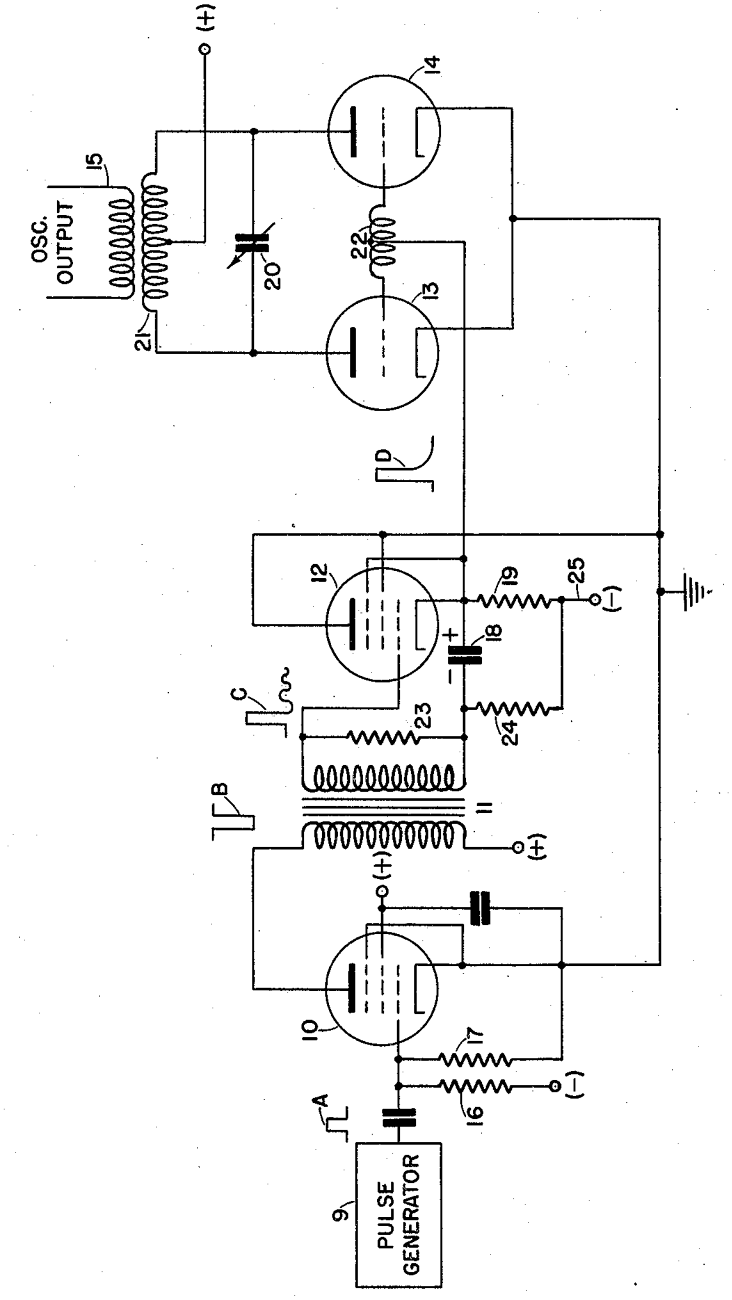
Inventor
MILTON W. ROSEN
By Ralph L Chappell
Attorney Patented Jan. 10, 1950 2,493,778

UNITED STATES PATENT OFFICE 2,493,778

KEYING SYSTEM

Milton W. Rosen, Washington, D. C.

Application August 3, 1945, Serial No. 608,813

5 Claims. (Cl. 250—36)

(Granted under the act of March 3, 1883, as amended April 30, 1928; 370 O. G. 757)

This invention relates to a means for keying a high frequency oscillator and in particular to such a means in which the power requirement for the operation of the system is a minimum.

In the past, keying systems of the type designed to remove a blocking voltage from a control element of a high frequency oscillator for short periods of time so as to permit the oscillator to produce short bursts of high frequency energy, were possessed with several disadvantages. Typical of these disadvantages are high power consumption in the standby (or between pulse) condition, inability to produce a keying signal of the proper peak voltage for optimum oscillator performance and inability to furnish sufficient power to drive the oscillator so that the envelope of the oscillatory bursts generated by the oscillator will maintain the same time-amplitude relationship as the modulating pulse.

An object of this invention is to provide an electronic keying circuit wherein the above mentioned disadvantages are reduced to a minimum.

Another object of this invention is to provide an oscillator pulse keying system in which the standby (or between pulse) power requirements are reduced to a minimum.

Other objects and features of the present invention will become apparent upon a careful consideration of the following detailed description when taken together with the accompanying drawing; the single figure of which is a circuit diagram illustrating in detail a preferred embodiment of the invention.

In the figure the invention is disclosed as incorporated in a repetitive type pulse system which comprises in part, a time base generator as represented by the pulse generator 9. This generator may be a blocking oscillator, a free running multivibrator, or any other suitable device arranged and adapted to produce uni-polar and short time duration pulses, preferably positive, of a uniform amplitude. The output from the pulse generator 9 is applied to and amplified by the amplifier 10, further amplified by a keying tube 12 and finally applied to the grid, for example, of a suitable type oscillator circuit. For purposes of illustration the oscillator is shown as comprising a pair of tubes 13 and 14 connected for push-pull operation by means of the center tap inductance 21 in the plate circuit, which inductance is tuned by a variable capacitance 20 connected thereacross. Output energy may be taken from the oscillator, for example, by a suitable link coupling circuit, indicated at 15, and applied to a remotely disposed antenna system, not shown. To provide the necessary feedback connections to cause and sustain oscillations a center tapped inductance 22 is connected to the grids of the tubes 13 and 14.

The amplifier 10 is shown as a pentode type of tube which is plate loaded by means of the primary winding of the transformer 11. The control grid of this amplifier is connected to the junction point of resistances 16 and 17 which are in turn connected between a negative potential and ground. By adjustments of the negative potential to which resistance 16 is connected and by properly selecting the resistances 16 and 17, tube 10 can be biased at a point near cut-off in its operating characteristic where a minimum of power is consumed by the tube.

In connecting the transformer 11 into the system, one side of the secondary winding thereof is connected through a large capacitance 18 to the cathode of the keying tube 12 while the other side is connected directly to the grid of the keying tube. The keying tube 12, itself, is cathode loaded by means of resistance 19 which is returned to a suitable source of negative potential indicated in general at 25, and the plate and screen are directly connected to ground. The grid of the keying tube 12 is returned through a resistance 24 to the negative potential 25 and the operating bias for tube 12 is then developed across the cathode load resistance 19 by way of a small conduction current flowing in the tube itself. Since the operating bias for tube 12 is usually only a few volts, resistance 19 can be chosen so that a small current flow in the tube will be sufficient to provide the biasing potential. Hence the quiescent power loss of this tube may be kept at a minimum. Furthermore, since the cathode of tube 12 is returned to a negative supply, a direct conductive connection can be made from the cathode of tube 12 to the grids of the oscillator, provided of course, that the negative supply 25 be chosen so as to hold the oscillator inoperative. An understanding of the operation of the invention may be facilitated by tracing a single positive pulse such as that indicated in the oscillogram A through the circuit. Such a pulse is amplified and inverted in the amplifier 10 and appears, as shown in oscillogram B across the primary of the transformer 11. The pulse signal is again inverted in the transformer and is applied as a positive pulse, such as shown by oscillogram C, to the grid of the keying tube 12. As the grid of tube 12 is driven positive in response to the applied pulse, its cathode also rises positively due to the increased voltage drop across the resistance 19. This rise in cathode voltage is communicated back through the large capacitance 18 to the secondary of the transformer 11 and is added to the applied pulse. In this manner the voltage 11 developed across the cathode resistance 19 of tube 12 may resemble that shown in oscillogram D which is greatly amplified over the pulse applied to the grid of tube 12.

For optimum operation certain considerations should be made in regard to the choice of the pulse transformer 11. These considerations should include a relatively high inductance in the primary winding of the transformer, a high coefficient of coupling between primary and secondary windings, low distributed capacitances and low leakage inductance. In some cases where the pulse to be passed through the transformer 11 is of abrupt leading and trailing edges the transformer may be shocked into oscillation. To keep these oscillations at a minimum, a suitable damping resistance 23 is connected in shunt across the secondary of the transformer. This resistance, however, may not be adequate to damp out all oscillations and thus one or two cycles of oscillations may occur despite the damping action of the resistance 23. The effect of these oscillations, however, is not felt by the oscillator 13, 14 since the pulse applied to the grid of tube 12 is positive and drives the grid above cathode potential causing it to draw current and charge capacitance 18 negatively. At the end of the applied pulse the bias on the grid of tube 12 will then be far below its normal operating bias and the low amplitude damped oscillations which occur will not be of sufficient amplitude to exceed the bias produced by the charging of the capacitance 18.

Although only a certain and specific embodiment of the present invention has been shown it is to be understood that many modifications are possible thereof. Therefore this invention is not to be restricted except insofar as necessitated by the spirit of the prior art and the scope of the appended claims.

The invention described herein may be manufactured and used by or for the Government of the United States of America for governmental purposes without the payment of any royalties thereon or therefor.

What is claimed is:

1. In a pulse transmission system including an oscillator having an oscillation control element therefor, an oscillator keying device comprising, a first and second vacuum tube each having at least an anode, a cathode and a control grid, a transformer having primary and secondary windings, said secondary winding having one end connected to the grid of said first tube, a capacitance connecting the other end of said secondary winding to the cathode of said first tube permitting the grid thereof to follow the cathode thereof, said primary winding connected in the anode circuit of the second of said tubes, said second tube being adapted to receive and amplify a keying pulse, a source of negative potential, means biasing the grid of said second tube to cut-off, a resistance loading element for said first tube connecting the cathode of said first tube to said source of negative potential whereby a negative potential exists at said cathode, and direct conductive means connecting the control element of said oscillator to said cathode, said resistance element being chosen so as to limit the quiescent current flow in said first tube to a minimum.

2. In a pulse transmission system including an oscillator having an oscillation control element therefor, an oscillator keying device comprising, a vacuum tube operating between ground and a negative potential, said vacuum tube having an anode, a cathode, and a control grid, said anode being connected directly to ground, a transformer having primary and secondary windings, one end of said transformer secondary winding connected to the control grid of said vacuum tube, a capacitance, said capacitance connecting the second end of said secondary winding to the cathode of said vacuum tube, said transformer primary winding being adapted to receive a keying pulse, a source of negative potential, an impedance loading element for said tube connecting the cathode of said tube to said source of negative potential whereby a negative potential exists at said cathode, and direct conductive means connecting the control element of said oscillator to said cathode, said impedance element being chosen so as to limit the quiescent current flow in said vacuum tube.

3. In a pulse transmission system including an oscillator having at least cathode and control grid elements, an oscillation keying device comprising a vacuum tube having at least an anode, a cathode, and a control grid, pulse generating means, a pulse transformer and a capacitance applying pulses from said means to said vacuum tube, said transformer being directly connected to the grid of said vacuum tube and through said capacitance to the cathode of said vacuum tube, a potential source having a positive and a negative terminal, a resistance means, one end of said resistance means being connected to said negative terminal, the other end of said resistance means being connected to the cathode of said vacuum tube and control grid element of said oscillator, and the positive terminal of said voltage source being connected to the anode of said vacuum tube and the cathode element of said oscillator, said potential source being operative to supply the anode potential for said vacuum tube and the grid bias potential for said oscillator.

4. In a pulse transmission system including an oscillator having at least cathode and control grid elements, an oscillation keying device comprising, first and second vacuum tubes each having at least cathode, anode and control grid elements, pulse generating means for applying a positive pulse to the control grid of said first tube, transformer means for coupling the negative pulse output of said first tube as a positive pulse to the control grid of said second tube, said coupling including a capacitance connecting the cathode of said second tube to said transformer means, means biasing the grid of said first tube to cut off, a potential source having a positive and a negative terminal, a resistance means, one end of said resistance means being connected to said negative terminal, the other end of said resistance means being connected to the cathode of said second tube and the control grid element of said oscillator, and the positive terminal of said voltage source being connected to the anode of said vacuum tube and the cathode element of said oscillator, said potential source being operative to supply the anode potential for said vacuum tube and the grid bias potential for said oscillator.

5. In a pulse system, a circuit for obtaining gain from a cathode follower stage comprising, a vacuum tube having at least anode, cathode, and control grid electrodes, a potential source having positive and negative terminals, a cathode load impedance connecting said cathode to said negative terminal, said anode being connected to said positive terminal, transformer means for applying a pulse across said grid and cathode electrodes, a capacitance comprising the connection between said transformer and said cathode whereby the pulse produced at said cathode is coupled back to said grid.

MILTON W. ROSEN.

REFERENCES CITED

The following references are of record in the file of this patent:

UNITED STATES PATENTS

| Number | Name | Date |
|---|---|---|
| 2,225,046 | Hunter | Dec. 17, 1940 |
| 2,338,395 | Bartelink | Jan. 4, 1944 |
| 2,407,272 | Hart | Sept. 10, 1946 |
| 2,413,182 | Hollingsworth | Dec. 24, 1946 |
| 2,419,566 | Labin | Apr. 29, 1947 |

OTHER REFERENCES

Review of Scientific Instruments, vol. 14, No. 6, June 1943, page 171.